Patented Oct. 26, 1926.

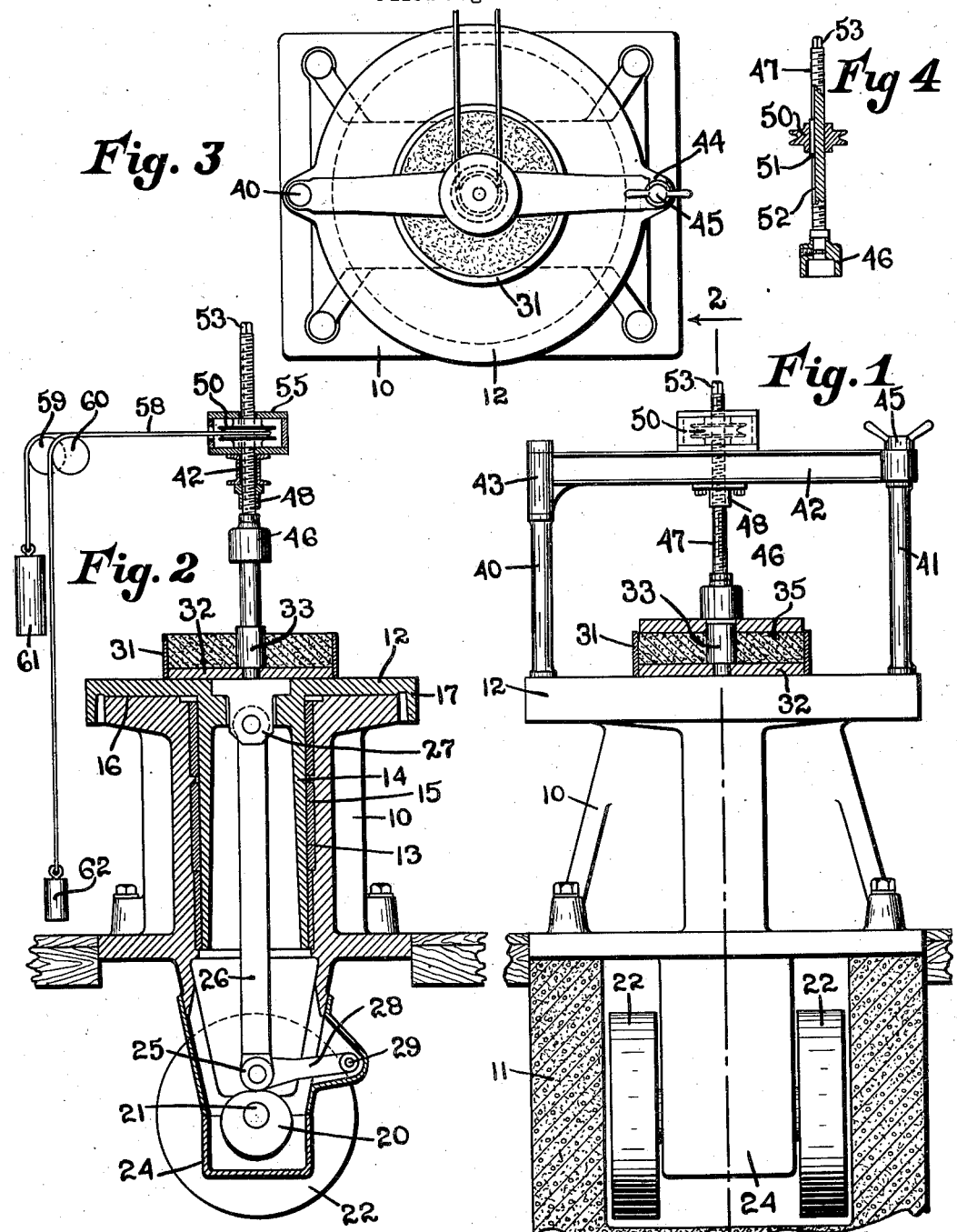

1,604,922

UNITED STATES PATENT OFFICE.

THURE LARSSON AND CHARLES J. HUDSON, OF WORCESTER, MASSACHUSETTS, ASSIGNORS TO NORTON COMPANY, OF WORCESTER, MASSACHUSETTS, A CORPORATION OF MASSACHUSETTS.

JOLTING APPARATUS AND METHOD OF MAKING ARTICLES OF BONDED GRAINS.

Application filed August 28, 1923. Serial No. 659,798.

Our invention relates to the art of plastics and more particularly to an apparatus for and a method of making refractory and abrasive articles and the like.

In the manufacture of refractory bricks and grinding wheels, there are two principal methods in use, one of which involves puddling or casting and the other pressing the green mixture into form before the ceramic material is fired. In accordance with the first method, the refractory or abrasive grains are mixed with a suitable bond of clay and other materials and is wetted with water to form a slip. This mixture is poured into a mold where it is held until the water has been dried therefrom. The dry body is then carefully removed from the mold and shaved to a desired shape, after which is it placed in a ceramic kiln and fired to vitrify the bond.

The puddling method is disadvantageous in that the use of a large amount of water necessitates a consequently long and expensive drying operation. Moreover, the body cannot be shaped until after it has been dried, hence a considerable capital investment and labor expense is involved in shaving the body to the desired proportions and in afterwards reclaiming the shavings which have been removed. Large breakage losses are liable to occur due to the fact that the green unfired body is very brittle and has but small coherence, hence handling of the dry mass must be conducted with great care.

In accordance with the second method of making a grinding wheel or other article, the grains and ceramic bond are mixed with a small amount of water to what is known as a dry press consistency, and the mixture is subjected to very high pressure to give it sufficient coherence for the subsequent operations. This method results in producing a very dense body. Moreover, it is found to be difficult to attain a uniform density throughout the mass, since the mixture is not capable of flowing in the mold when pressed, and any localized excess of material not leveled off will be pressed into a dense hard spot, which not only has a different grinding grade but serves to unbalance the wheel.

It is accordingly an object of our invention to overcome the disadvantages of the prior methods and to provide an economical and efficient method of making an article of bonded granular material and of producing a body which is of substantially uniform density and yet retains an open porous structure.

A further object is to provide a jolting apparatus for shaping such articles which will not permit loosening of the top layer of the material but causes it to assume a uniform density throughout the mass.

With these and other objects in view as will be apparent in the following disclosure, our invention resides in the steps of the method and in the combination of parts described in the specification and set forth in the claims appended hereto.

Referring to the drawings illustrating one embodiment of our invention and in which like reference numerals indicate like parts:

Fig. 1 is a front elevation of a jolting machine with the foundation and mold shown in section;

Fig. 2 is a section on a line 2—2 of Fig. 1, with the screw shown in a raised position;

Fig. 3 is a top plan view; and

Fig. 4 is a fragmentary detail in section showing the splined connection between the driving pulley and the follower screw.

In the course of our experimentation, we have found that a refractory article, a grinding wheel and the like may be made by a method which comprises jolting the mixed material to the required shape, and we have furthermore provided a specific method which will insure the manufacture of a body of substantially uniform density and yet will maintain a porous and open structure such as is often required.

As a specific illustration of our method, we may make a grinding wheel in accordance with the following sequence of steps. The abrasive grain which may be of suitable material, such as crystalline alumina or silicon carbide, is mixed in proper grain sizes and suitable proportions with a bond adapted therefor, such as a mixture of ceramic materials as is well known in the art. While the grain sizes and relative proportions and types of bond and grains may obviously be varied within wide limits, one composition which is adapted for making a grinding wheel may consist of the following materials in the proportions specified:

| | Parts by weight. |
|---|---|
| Silicon carbide grain | 80 |
| Feldspar | 13 |
| Ball clay | 7 |

These materials are thoroughly mixed, and preferably in a dry condition, after which water is added to produce the desired degree of cohesiveness required for what is known as "dry pressing", which will insure the mass holding together during the subsequent operations until the bond has been hardened. That is, we ordinarily add water to form 1¾ to 4% by weight of the total mass, depending of course upon the type and amount of the bond employed.

This mixture is then placed in a mold of desired shape and is jolted on a suitable machine until it has settled into a compact mass of uniform density. Thus, the first step is that of filling the mold, which is done while the jolting machine is in operation. The second feature of the jolting operation involves confining the mass on all sides to prevent the grains in the upper layer from dancing about and not remaining in close contact with the material beneath, as the mold vibrates. Since it is desirable that the layers adjacent the top of the mass receive substantially the same pressure as those near the bottom of the mold, we preferably place a removable cover plate on the mixture in the mold and hold it in position by means of a follower mechanism which feeds downwardly as the mass is compacted.

While various jolting machine constructions may be employed, we preferably utilize the mechanism illustrated in which the jolting is accomplished by means of a cam which lifts the mold carrier and drops it through a fixed distance against an immovable stop, thus giving a sharp blow. The mold is preferably jolted or dropped through a fixed length of stroke, so that the same jolting effect is obtained at each stroke. The operation is carried on for a definite period of time, such as two minutes, which is found to be suitable for the particular material being treated.

Since the material has been thus shaped in an almost dry condition, it may thereafter be fired without any intermediate drying operation, but it is preferable that the green mass be dried for 24 hours or so, to avoid the possibility of any detrimental swelling. The bond hardening operation is carried on in accordance with methods well known in the art, and ordinarily involves, if a vitrifiable bond is used, heating the article under a heat condition approximating Seger cone 13, or at a temperature of about 1300 degrees C. for 100 hours, more or less. This firing operation results in vitrifying the clay material to a porcelanic or vitreous condition depending upon the nature of the bond and uniting the refractory or abrasive grains into a substantially integral mass. The article thus formed may then be finished to final dimensions in accordance with standard methods or otherwise treated depending upon the use to which it is to be put.

As a simple form of apparatus capable of carrying out the jolting operation, we have shown in the drawing a device comprising a base 10, which is securely fastened to a foundation 11 of concrete or the like and a reciprocable table 12, arranged to be moved vertically and permitted to strike with a sharp blow against the top of the base. This base may be made with an internal cylindrical portion 13, within which is slidably mounted a tubular extension 14 projecting downwardly from the table top 12. Suitable bearings or bushing members 15 may be provided between the base and the slidable part 14 and proper steps taken to insure a supply of oil therebetween.

The base 10 may be provided with a flat top portion 16, against which a similar plain portion on the underside of the table 12 may rest, when in its lowermost position. An overhanging flange 17 on the table 12 serves to prevent dust or foreign matter from getting between the table 12 and the flat top of the base 10 and so affecting the jolting operation.

The table is reciprocated by means of a cam 20 mounted on a shaft 21 which carries pulleys 22 suitably arranged for driving the cams at a desired speed of rotation. This shaft 21 is suitably mounted in bearings in the casing 24, which is suspended from the underside of the base 10.

A roller 25 rotatably mounted on the lower end of a crank member 26 contacts with the effective surface of the cam 20 and serves to reciprocate the crank 26. The upper end of the crank 26 is pivotally mounted on a pin between the two lugs 27 which project downwardly from the table member 12 into the piston member 14, as illustrated. The roller 25 is maintained in proper position relative to the cam, by means of a short arm 28, which is pivotally connected at one end to the crank 26 and is mounted at the other end on a pin 29 suitably supported by the casing 24.

The table is arranged to carry the jolted material thereon. It may be made flat on its upper surface and carry a removable mold of suitable shape and dimensions for jolting the material therein. As illustrated, the mold may comprise a ring 31 having a removable bottom 32, and if desired a central core 33 adapted to form a hole in the grinding wheel being produced. In order to carry out one step of this process, we provide a cover plate 35, as shown in Fig. 1, this plate being made to fit within the ring and follow down with the material as it is jolted into a compact mass.

We have found that in jolting machines of this type, there is a tendency for the material in the upper layer to dance or to become loosened from the mass and for cracks to form throughout the article. As heretofore constructed, the cam has been provided with a cutaway portion which permits the table to fall freely during the downward stroke, and with the cam follower out of contact with the cam.

In accordance with our invention, we so shaped the cam that the follower will be in contact therewith substantially during the whole period of fall and the table will be jolted by a continuously controlled motion. To this end, we shape the cam face substantially in accordance with a gravity curve, so that as the cam rotates at its uniform speed, the cam roller 25, in following the cam surface, will permit the table to drop under the influence of gravity at substantially its full rate and thereby give the table the required shock. It will be noted that the shape of the cam is such that when the table receives the required shock, it is caused to rise immediately and thus its motion is continuously controlled, and bouncing of the table is minimized. The shape and dimensions of the cam are determined by the distance through which the table is required to drop and it is entirely within the skill of a mechanic skilled in this art to so change the sizes of these parts as to produce a given length of drop and type of stroke.

As a further improvement we propose to place a follower plate on top of the material being jolted and provide a follower mechanism so constructed as to hold the plate against the material and prevent it from becoming separated from the mass beneath as it is jolted. To this end we may employ a screw threaded member which is so arranged and operated that as the plate descends, due to the compacting of the jolted material, this screw is rotated and the plate urged firmly against the material. Movement of the plate upwardly as the table vibrates is prevented by the screw.

Mounted on the upper side of the table 12 are two standards 40 and 41. These support a cross member 42 which is pivotally mounted on the upper end of the standard 40 for horizontal movement. The free end of the member 42 is arranged to be locked to the top of the member 41. To this end we may provide one end of the member 42 with an enlarged portion 43, which is bored to fit and rotate on a reduced end of the standard 40. The other end of the cross member 42 has a slotted portion 44 adapted to be locked in place by a clamping nut 45 threaded to the top of post 41.

Supported from the cross member 42 is a follower mechanism arranged to hold the plate 35 in position. This comprises a presser foot 46 which is rotatably mounted on the lower end of the screw 47. This screw is threaded into a nut 48, which is secured to the underside of the cross member 42, and passes loosely through the member 42. It is arranged to be suitably driven as by means of a pulley 50 which is slidably keyed thereto by a key 51 in the pulley fitting in a keyway 52 in the shaft. The upper end of the screw may also be provided with a squared-off portion 53 whereby the screw may be turned by means of a handle. The pulley 50 is enclosed in a housing 55 fixed on the cross member 42, so that irrespective of the position of the screw and the follower 46, the pulley is definitely located in a fixed position.

In order to keep the follower pressed down tightly against the plate 35, we provide means for continually exerting a rotative pressure upon the pulley which tends to move the screw downwardly. This may comprise, as one embodiment of our invention, a system of differential weights suitably connected with the pulley by a driving cord 58, which passes through an aperture in the box 55 and around the pulley. This cord passes over two fixed pulleys 59 and 60 and on the two ends of the cord are weights 61 and 62. The heavier weight 61 is on that end of the cord which will tend to rotate the pulley in such a direction as to move the follower downwardly.

It will now be seen that when the cam 20 is operated and the table 12 is moved up and down with a jolting motion, the cord 58 will swing about the pulleys 59 and 60 and permit this movement. At the same time the heavier weight 61 is constantly exerting a torque upon the screw which prevents the follower plate from becoming loosened from the material being jolted.

In accordance with this invention we have provided a very simple method and apparatus for manufacturing articles of ceramic bonded refractory and abrasive materials, which eliminates the operation of shaving the green mass and cuts the drying time by 90% or more as compared with that involved in treating puddled wheels. Moreover, by employing this method one has greater latitude in his choice of bonding materials since the method is not largely dependent upon the plasticity characteristic of the clays as is the case with puddled wheels.

Owing to the uniformity of density produced by this method we find that the wheels are in well balanced condition and consequently are less likely to break. One of the great problems met in making grinding wheels is that of getting a well balanced wheel, it being necessary for the inspectors to reject a large percentage in order to prevent the possibility of a wheel bursting and injuring a workman or of causing vibrations and chatter marks on the work being ground. This method is particularly adapted for making those wheels which are difficult to handle, such as the type known as cylinders, which have large central openings, since at least half of the handling operations normally required are eliminated in this method.

It is thought that one reason why a wheel of this type has a more uniform density than a puddled wheel is that it is less possible for dense masses of material to segregate, where the grains and bond are merely dampened as in the present case, than where the wheel material is puddled or formed in a fluid or slip condition. If the abrasive material tends to segregate and form hard spots, the jolting action will break them down and distribute the material uniformly throughout the mold. The structure of the jolted wheel corresponds with that of the puddled wheel in its openness and porosity, thereby offering an advantage over the pressed wheel which may have too great a density for many types of grinding operations. Other advantages will be apparent to those skilled in the ceramic art. It is also clear that this invention is not limited to the materials and types of finished product herein specified, but applies broadly to various articles, such as a concrete block, which may be made by the jolting operation.

Having thus described our invention, what we claim as new and desire to secure by Letters Patent, is:

1. The method of making an abrasive article of bonded granular material comprising the steps of intimately mixing abrasive grains with a ceramic bond and a fluid to form a moldable but non-fluid mass and thereafter jolting the mass to obtain a dense body of uniform composition throughout while confining it on all sides and preventing free movement of the top layer thereof so as to preclude the formation of laminations in the finished article.

2. The method of making an article of bonded refractory grains comprising the steps of mixing said grains with a bond and water to form a moldable mass, jolting the material in the mold as a preliminary settling operation, thereafter confining the top layer of the material and jolting until a substantially uniform density has been obtained and subsequently drying and hardening the bond.

3. The method of forming an abrasive article of ceramic bonded granular material comprising the steps of mixing abrasive grains intimately with a vitrifiable ceramic bond and water to develop the desired moldability, subjecting the mixture to a continuously controlled jolting action while maintaining it confined on all sides to obtain a dense body of uniform composition and homogeneous structure, and subsequently firing the mass to vitrify the bond.

4. A jolting apparatus comprising a fixed base, a vertically reciprocable table having a portion adapted to strike against said base, means to move said table and permit the same to drop with a continuously controlled motion, a follower plate arranged over the material on said table, and means to hold said follower plate in contact with said material during the jolting operation.

5. A jolting apparatus comprising a fixed base, a reciprocable table, means to jolt the same, a follower plate arranged to contact with material on said table, a screw fed member removably engaging said plate and means to rotate the screw as jolting proceeds to hold the plate in contact with the material.

6. A jolting apparatus comprising a fixed base, a reciprocable table, means to jolt the same, a follower plate arranged above the table to contact with the material thereon, a screw threaded device contacting with said plate and means including a weighted member arranged to exert a force to rotate said screw and hold the plate against said material as jolting proceeds.

7. A jolting apparatus comprising a fixed base, a reciprocable table, means to jolt the same, a follower plate removably located above said table to contact with material thereon, a support mounted on said table, a follower device including a screw threaded member through said support, a pulley fixed on said screw to rotate the same and means including a differential weight system connected with said pulley which tend to rotate the screw and urge the follower plate downwardly as jolting proceeds.

Signed at Worcester, Massachusetts, this 27th day of August 1923.

THURE LARSSON.
CHARLES J. HUDSON.